US010401231B2

(12) United States Patent
Poikola (10) Patent No.: US 10,401,231 B2
(45) Date of Patent: Sep. 3, 2019

(54) PWB WITH TEMPERATURE SENSOR MATRIX ALLOWING THERMAL IMAGING OF THE PWB

(71) Applicant: Nokia Technologies Oy, Espoo (FI)

(72) Inventor: Samuel Juho Vertti Poikola, Kiiminki (FI)

(73) Assignee: Nokia Technologies Oy, Espoo (FI)

( * ) Notice: Subject to any disclaimer, the term of this patent is extended or adjusted under 35 U.S.C. 154(b) by 212 days.

(21) Appl. No.: 15/473,952

(22) Filed: Mar. 30, 2017

(65) Prior Publication Data

US 2018/0283962 A1 Oct. 4, 2018

(51) Int. Cl.
G01K 7/00 (2006.01)
G01K 1/00 (2006.01)
G01K 7/16 (2006.01)
G01K 1/14 (2006.01)

(52) U.S. Cl.
CPC ........... *G01K 7/16* (2013.01); *G01K 1/14* (2013.01)

(58) Field of Classification Search
USPC ................................ 374/185, 166, 124, 208
See application file for complete search history.

(56) References Cited

U.S. PATENT DOCUMENTS

| 5,902,044 A | 5/1999 | Pricer et al. |
| 5,969,639 A | 10/1999 | Lauf et al. |
| 6,964,205 B2 | 11/2005 | Papakostas et al. |
| 7,187,053 B2 | 6/2007 | Boerstler et al. |
| 7,460,972 B2 | 12/2008 | Somayaji et al. |
| 9,006,000 B2 | 4/2015 | Hanan et al. |
| 2006/0075760 A1 | 4/2006 | Im et al. |
| 2009/0285261 A1 | 11/2009 | Casey et al. |
| 2018/0172521 A1* | 6/2018 | Diglio .................... G01K 3/14 |

OTHER PUBLICATIONS

Nora Martiny et al., "Development of a thin-film thermocouple matrix for in-situ temperature measurement in a lithium ion pouch cell", IEEE Sensors Journal 2014, 14, 3377-3384.

Danick Brianda, et al., "Making environmental sensors on plastic foil", Materials Today, vol. 14, Issue 9, Sep. 2011, pp. 416-423.

Jieyi Long, Seda Ogrenci Memik, Gokhan Memik, Rajarshi Mukherjee "*Thermal Monitoring Mechanisms for Chip Multiprocessors*" ACM. Trans. Architec. Code Optim. 5,2, Article 9 (Aug. 2008), 33 pages. DOI=10.1145/1400112.1400114 http://doi.acm.org/10.1145/1400112.1400114.

(Continued)

*Primary Examiner* — Mirellys Jagan
(74) *Attorney, Agent, or Firm* — Harrington & Smith (57) ABSTRACT

An apparatus includes a printed wiring board including multiple layers including inner and outer layers. At least one of the inner layers includes an integral temperature sensor matrix. The temperature sensor matrix includes multiple temperature sensors arrayed over at least part of area occupied by the at least one of the layers. A method includes measuring information corresponding to temperatures in the temperature sensor matrix, and outputting indications of the information. The information may be displayed, e.g., as a thermal image of the printed wiring board.

20 Claims, 8 Drawing Sheets

(56) References Cited

OTHER PUBLICATIONS

Cheol Hee Ahn, Hyung Hoon Kim, Je Myung Cha, Bong Hyun Kwon, Man Yeong Ha, Sang Hu Park, Ji Hwan Jeong, Kui Soon Kim, Jong Rae Cho, Chang Min Son, Jung Ho Lee and Jeung Sang Go, "*Fabrication and Performance Evaluation of Temperature Sensor Matrix Using a Flexible Printed Circuit Board for the Visualization of Temperature Field*" Pusan National University (Jan. 2010).

Patentability Search Report, "*Thermal Imaging of the PCB with Temperature Sensor Matrix*" p. 4. Feb. 10, 2017.

* cited by examiner

PWB WITH TEMPERATURE SENSOR MATRIX ALLOWING THERMAL IMAGING OF THE PWB

TECHNICAL FIELD

This invention relates generally to printed wiring boards (PWBs) and, more specifically, relates to sensing temperature of the PWBs.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Printed wiring boards (PWBs, also referred to a printed circuit boards, PCBs, or also as boards in this document) are boards having multiple layers. A PWB mechanically supports and electrically connects electronic components using conductive tracks, pads and other features etched typically from copper sheets laminated onto a non-conductive substrate. Usually one or both of the top and bottom layers have the electronic components on them, like microprocessors, memory chips, capacitors, inductors, amplifiers, and the like. The inner layers typically have ground, power, and/or signal routing. Such boards have been used for electronics for many years and basically any electronics (such as smartphones, laptops, personal computers, tablets, televisions, receivers, etc.) contain such PWBs.

The electronic components attached to the boards can create high temperatures in the PWB. At the moment, we only measure temperature with few external temperature sensors and get only spot temperatures of the boards. Furthermore, there is no method of producing a thermal image of the board when there is no line of sight to the board, such as when the board has a cover, a heat sink, or the like blocking the direct view to enable thermal imaging of the board. Thus, some of the hot spots in the board, in both the research and development phase and in the field, are not found with the current method, and consequently many boards are released having less than ideal temperature profiles. Every component has a certain operating temperature range, and by violating this range, there will be a dramatic decrease in the life time of the component. Even if the component's temperature stays in the "approved" operating range, a higher temperature means a reduced lifetime, especially for capacitors. Furthermore, exceeding the allowed environmental temperature range may cause overstressing of wire bonds, thus tearing the connections loose, cracking the semiconductor dies, or causing packaging cracks. Humidity and subsequent high temperature heating may also cause cracking, as may mechanical damage or shock to components weakened by excess heat.

BRIEF SUMMARY

This section is intended to include examples and is not intended to be limiting.

In an exemplary embodiment, an apparatus, comprises a printed wiring board comprising multiple layers including inner and outer layers. At least one of the inner layers comprises an integral temperature sensor matrix, the temperature sensor matrix comprising multiple temperature sensors arrayed over at least part of area occupied by the at least one of the layers.

In another exemplary embodiment, an apparatus comprises: a printed wiring board comprising multiple layers including inner and outer layers, wherein a selected one or more of the inner layers comprises an integral temperature sensor matrix, the temperature sensor matrix comprising means for measuring temperature, the means for measuring temperature arrayed over at least part of an area occupied by the selected layer.

A further exemplary embodiment is a method. The method comprises: measuring information corresponding to temperatures in a temperature sensor matrix, the temperature sensor matrix formed in selected one or more of inner layers of a printed wiring board comprising multiple layers including inner and outer layers, the temperature sensor matrix comprising multiple temperature sensors arrayed over at least part of an area occupied by the selected layer; and outputting indications of the information.

An additional exemplary embodiment is an apparatus. The apparatus comprises: means for measuring information corresponding to temperatures in a temperature sensor matrix, the temperature sensor matrix formed in selected one or more of inner layers of a printed wiring board comprising multiple layers including inner and outer layers, the temperature sensor matrix comprising means for measuring temperature, the means for measuring temperature arrayed over at least part of an area occupied by the selected layer; and means for outputting indications of the information.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As previously described, typically on a PWB only a few temperatures are measured with a few external temperature sensors. Thus, only spot temperatures of the boards are measured. By contrast, in the exemplary embodiments herein, a temperature sensor matrix is made with printed electronics, into a layer of a PWB and data from the temperature sensor matrix may be used for making a thermal image from the product under test. This may increase the quality of thermal design of the board.

Creating a temperature sensor matrix with printed electronics may provide some thousands, tens of thousands, or hundreds of thousands (or more) measurement points at once and software may create a detailed thermal image according to the measurement results. The printed electronics film containing temperature sensor matrix may be assembled inside and integral to the PWB when the board under test is manufactured, so that the temperature sensor matrix is part of the PWB structure. The temperature sensors would be manufactured with a thick film technique, as this technique allows the temperature sensors to be both manufactured and built into the PWB. As the temperature sensor matrix or matrices are inside the PWB the top and the lowest surfaces of PWB may be able attach more electrical components.

Figure 1A:
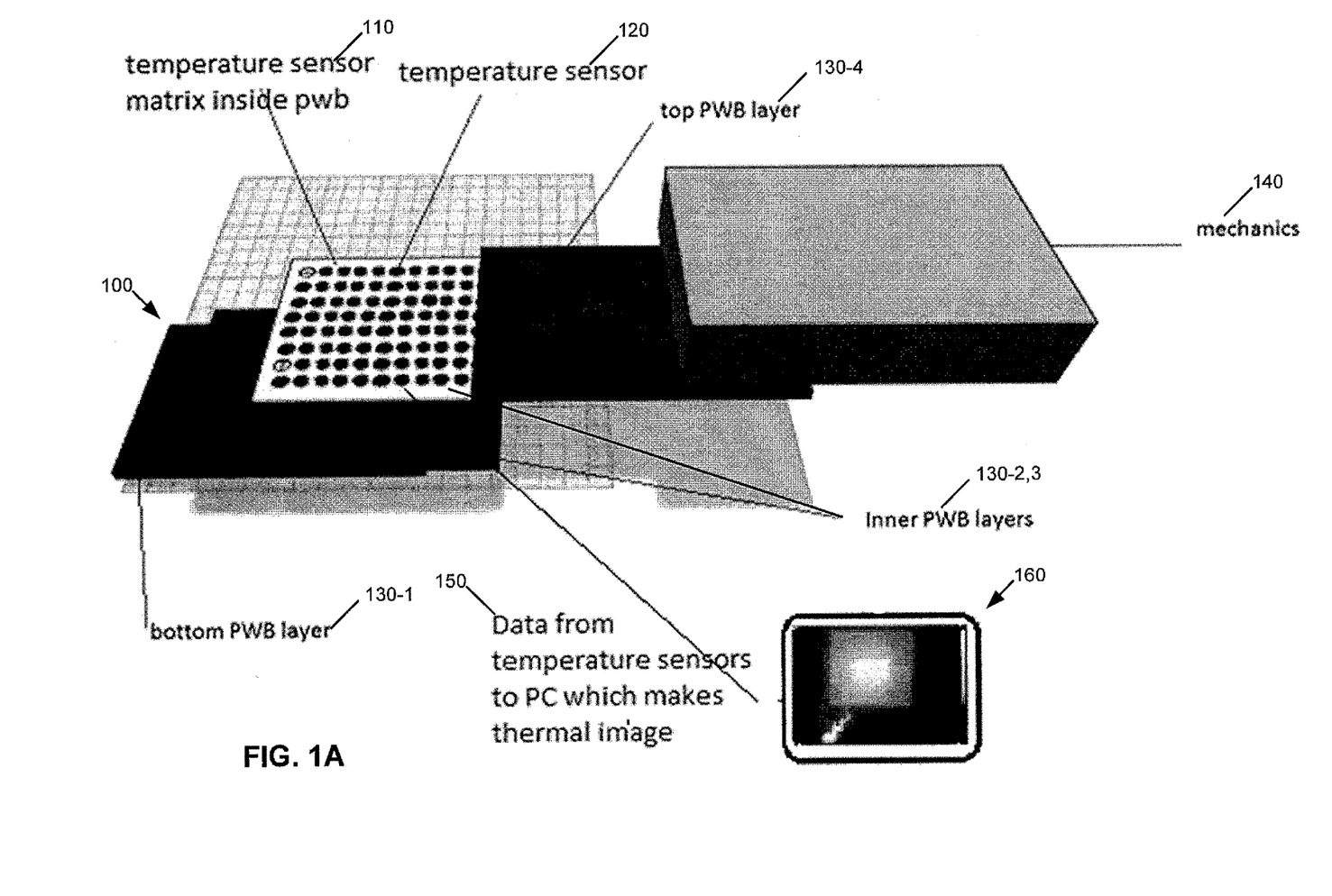
FIG. 1A illustrates a PWB with a temperature sensor matrix integral with and built into a layer of the PWB, in accordance with an exemplary embodiment.
Figure 1B:
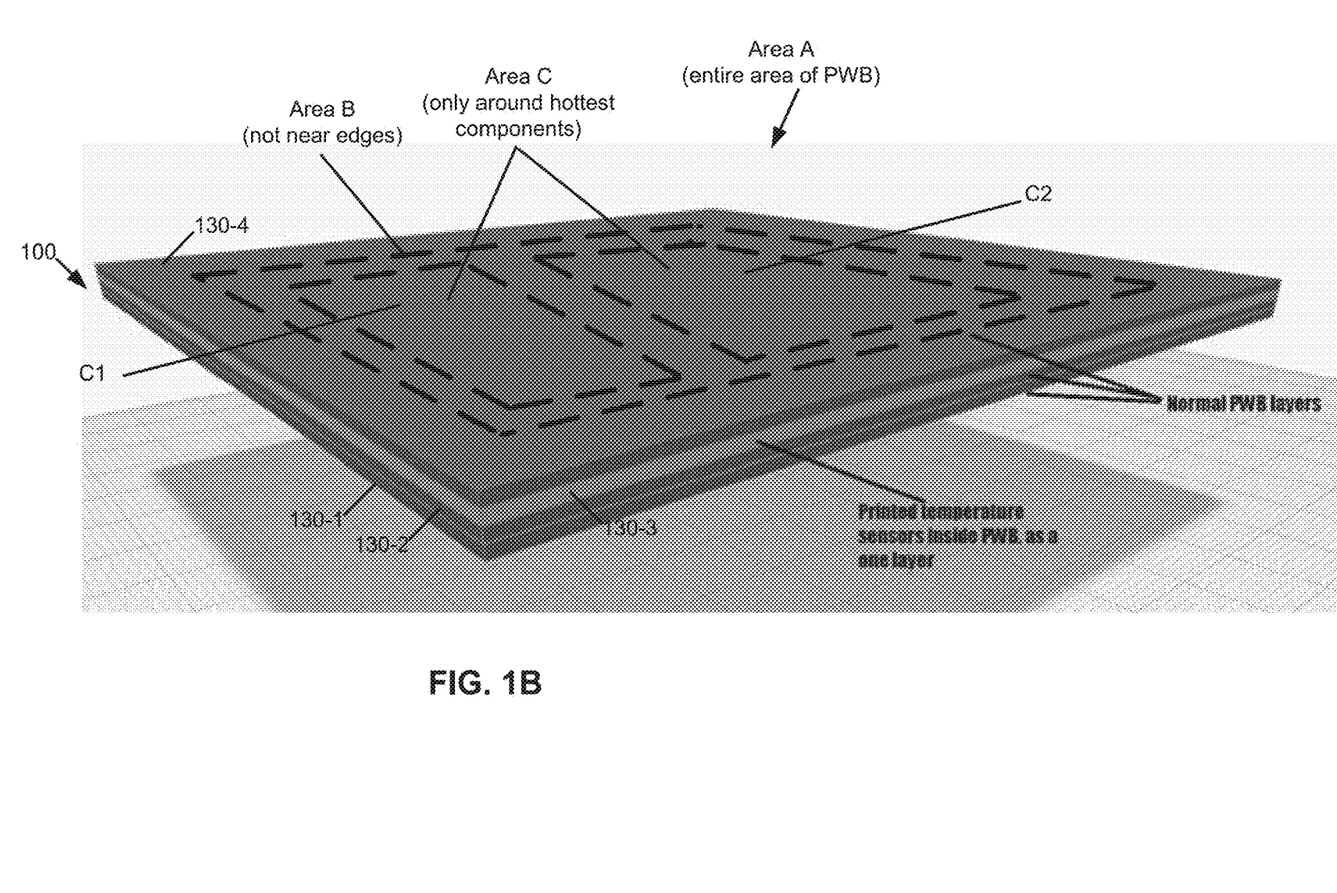
FIG. 1B illustrates another view of the PWB of FIG. 1A, but without the electrical components on the top layer and without the mechanics.

An exemplary embodiment that illustrates these concepts is shown in FIGS. 1A and 1B. FIG. 1A illustrates a PWB 100 with a temperature sensor matrix 110 assembled inside and built into a layer of the PWB, in accordance with an exemplary embodiment, and FIG. 1B illustrates another view of the PWB of FIG. 1A, but without the electrical components on the top layer and without the mechanics.

FIG. 1A shows an example of a PWB 100 comprising PWB layers 130-1 through 130-4. Mechanics 140 may be placed on top of the top PWB layer 130-4. The mechanics 140 can be anything that is on the top of the PWB, such as a cover, a heatsink, a molding, and the like. The PWB 100 comprises a bottom PWB layer 130-1, two inner PWB layers 130-2,3, and a top PWB layer 130-4. The number of PWB layers 130 may be different than depicted in this example embodiment. In this example, the PWB layer 130-3 is formed such that the temperature sensor matrix 110 (comprising many temperature sensors 12) is inside the PWB and is formed as part of the PWB layer 130-3. Reference 150 illustrates that data from the temperature sensors 120 in the matrix 110 may be sent to one or more computer systems, which makes a thermal image 160 from the data. The PWB 100 may comprise one or more temperature sensor matrices 110.

FIG. 1B illustrates that the temperature sensors 120 are located inside and integral with the PWB 100, as a single layer 130-3 in the PWB 100. The temperature sensors 120 may be formed via a printing process, using thick film techniques, as an example.

In the examples of FIGS. 1A and 1B, the temperature sensor matrix 110 comprises multiple temperature sensors 120 arrayed over at least part of the area occupied by the layer. This concept is illustrated in FIG. 1B by Area A, which is the entire area occupied by the PWB layer 130-3 (and the entire area of the PWB 100). However, the area may cover only a part or a suitable area of the PWB 100. For example, the area or areas in the PWB that are the most interesting in thermal management. This is illustrated by Area B in FIG. 1B, which is expected to contain the majority or all of the electronic components. As another example, it may be beneficial to measure the temperature under the area covered by a certain component or components attached on the PWB. This is illustrated by Area C of FIG. 1B, where the temperature sensor matrix 110 occupies two portions C1 and C2 of the PWB 100 and the layer 130-3. Additionally, it should be understood that temperature sensor matrices 110 may occupy multiple layers 130 if desired.

Figure 2A:
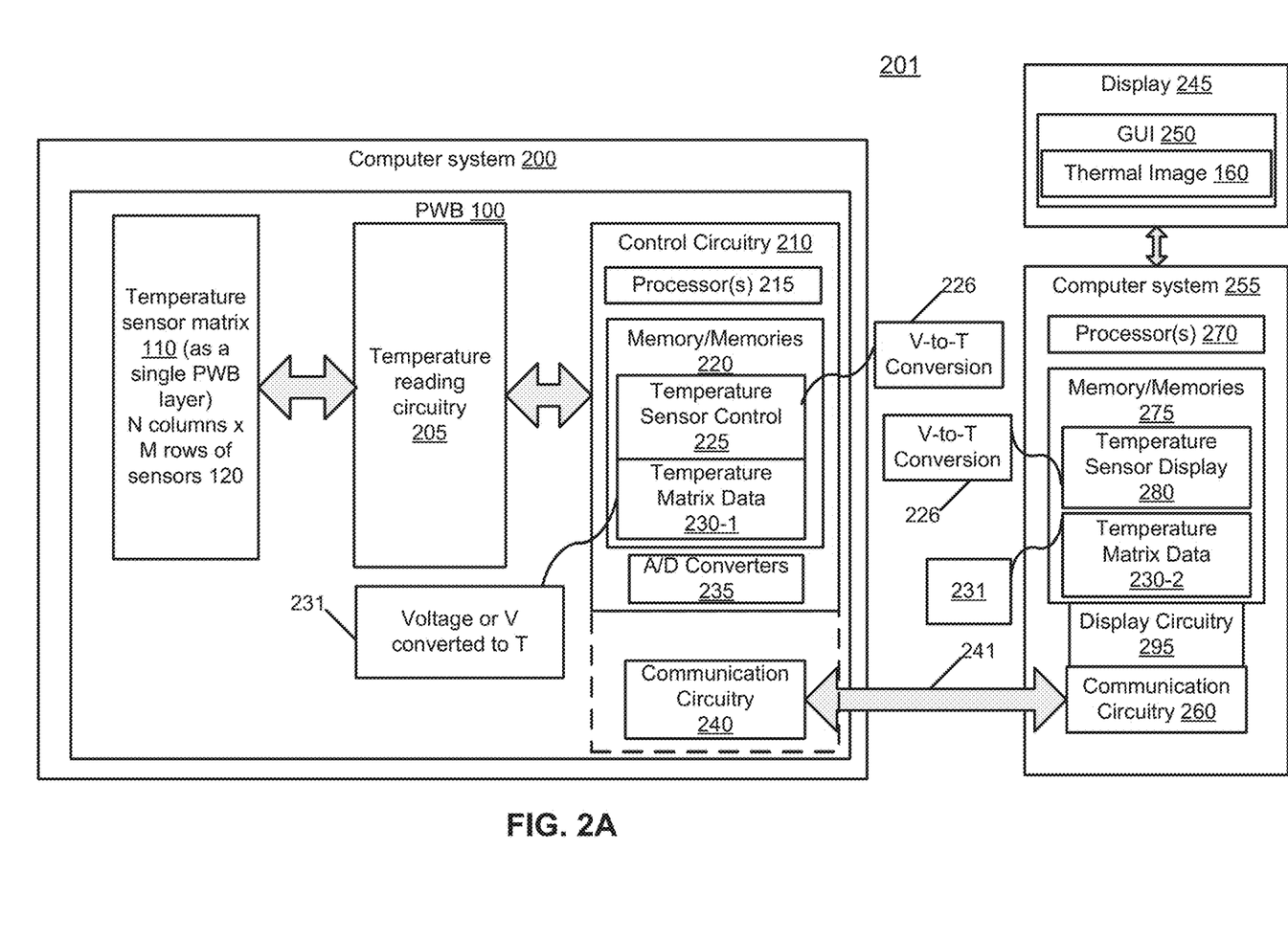
FIG. 2A is an illustration of a system including the PWB with temperature sensor matrix and that uses data from temperature sensor matrix to display a thermal image.

There are a number of options for integrating the temperature sensor matrix 110 with the PWB 100 and retrieving the data from the temperature sensors 120. FIG. 2A is an example illustration of a system 201 including the PWB with temperature sensor matrix and that uses data from temperature sensor matrix configured to display a thermal image. In FIG. 2A, the PWB 100 may be implemented as part of a computer system 200, and data from the temperature sensor matrix 110 may be transferred from one computer system 200 to another computer system 255, via link 241. The computer system 255 then displays the thermal image 160 via the display 245.

In this example, the computer system 200 comprises the PWB 100, which itself comprises the temperature sensor matrix 110, temperature reading circuitry 205, and control circuitry 210. The computer system 200 comprises communication circuitry 240, which may be formed as part of the control circuitry 210 or formed on the PWB 100 separately from the control circuitry 210. The control circuitry 210 may comprise one or more processors 215, one or more memories 220, and A/D converters 235. The one or more memories comprise temperature sensor control programming 225 and temperature matrix data 230-1. The temperature sensor control programming 225 comprises computer readable code. The one or more processors 215 cause the control circuitry 210 and the computer system 200 to perform the operations described herein in response to retrieving the temperature sensor control programming 225 from the one or more memories 220 and executing the same.

The temperature sensor matrix 110 is printed and formed as an integral part of a single layer 130 of the PWB 100, and contains N columns and M rows of temperature sensors 120. The temperature reading circuitry 205 comprises circuitry (illustrated, e.g., in FIG. 3A) in an exemplary embodiment that reads a voltage from each of the temperature sensors 120. The A/D converters 235 convert analog voltage to digital values of the voltages output by the temperature reading circuitry 205. The voltages (see reference 231) may be stored as digital values in the temperature matrix data 230-1, or the temperature sensor control programming 225 may be programmed with a voltage-to-temperature (V-to-T) conversion (see reference 226) to convert the digital values of voltage (V) to temperature (T) (see also reference 231) as the temperature matrix data 230-1.

The computer system 255 is configured to display the thermal image 160 of the PWB 100 on a GUI 250 of the display 245. The computer system 255 comprises one or more processors 270, one or more memories 275, display circuitry 295, and communication circuitry 260. The one or more memories 275 comprise temperature sensor display programming 280 and temperature matrix data 230-2. The display circuitry 295 is circuitry configured to run the display 245. The temperature sensor control programming 225 comprises computer readable code. The one or more processors 270 cause the computer system 255 to perform the operations described herein, in response to receiving a command to display the thermal image 160 and retrieving the temperature sensor display programming 280 from the one or more memories 275 and executing the same.

The temperature matrix data 230-2 may be voltage (stored as digital values of the same) or voltage that has been converted to temperature, as indicated by reference 231. If the temperature matrix data 230-2 is voltage, the temperature sensor display programming 280 may be programmed with the voltage-to-temperature conversion 226 to convert voltages to temperatures.

The communication circuitry 240, 260 may be any circuitry to communicate digital data, such as a universal serial bus, short-range wireless communications, or wired or wireless local area networks, for example.

Figure 2B:
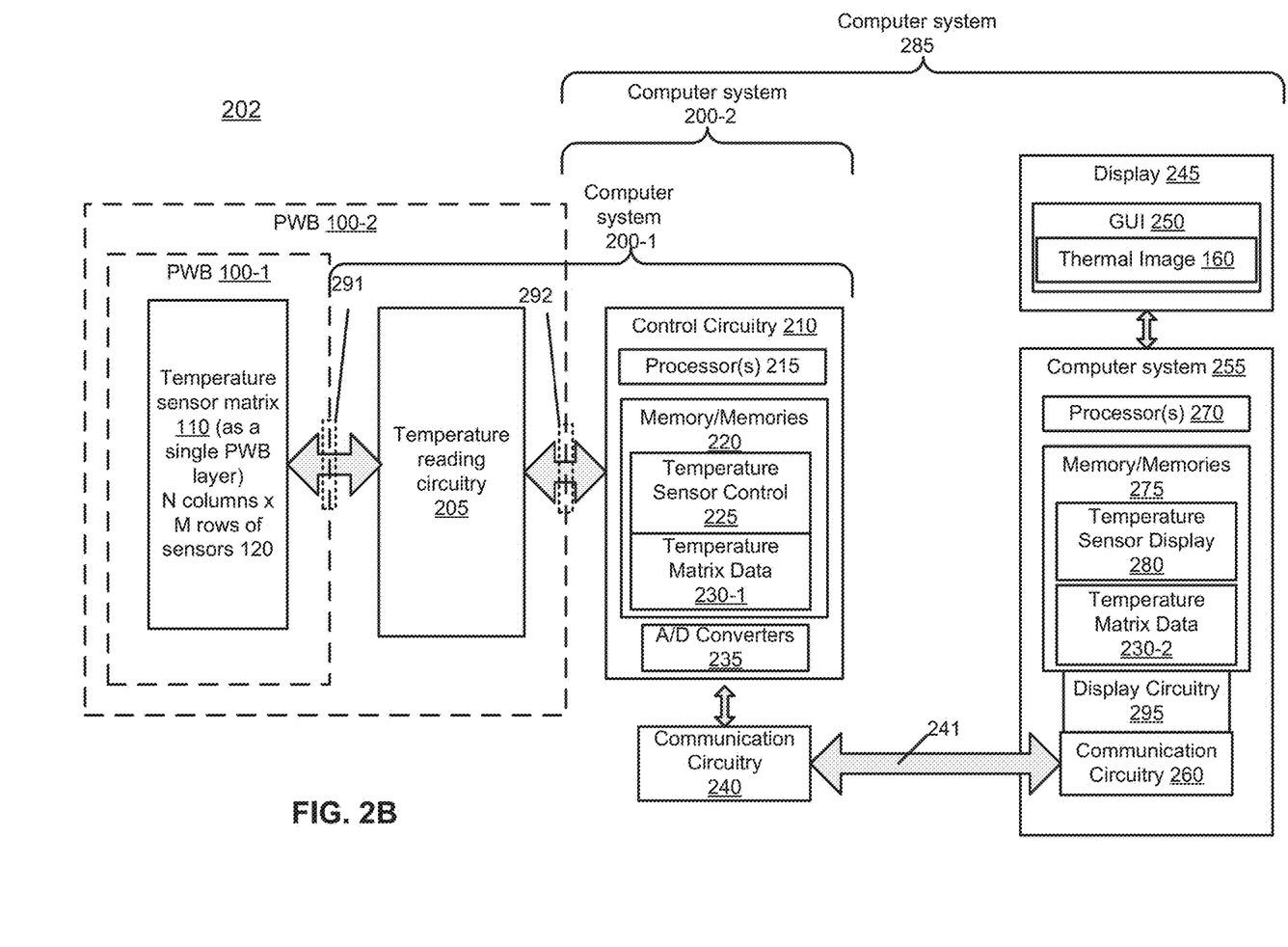
FIG. 2B is an illustration of another system including the PWB with temperature sensor matrix and that uses data from temperature sensor matrix to display a thermal image.

It is also possible for some or all of the temperature reading circuitry 205 and the control circuitry 210 to be located off the PWB 100. FIG. 2B is an illustration of another system 202 including the PWB with temperature sensor matrix and that uses data from temperature sensor matrix to display a thermal image.

In one example the PWB 100-1 comprises the temperature sensor matrix 110 and connectors 291, which allow connection to a computer system 200-1 comprising the temperature reading circuitry 205 and the control circuitry 210. In another example, the PWB 100-2 comprises the temperature sensor matrix 110, the temperature reading circuitry 205 and connectors 292, which allow voltages from the temperature reading circuitry 205 to be coupled to the computer system 200-2 (comprising the control circuitry 210). The computer system 200-2 (or even 200-1) may be combined with the computer system 255 to create a single computer system 285, which would not only control reading of information corresponding to temperatures for the sensors 120 of the matrix 110, but also display the thermal image 160. Other examples are possible, such as putting the A/D converters 235 on the PWB 100-2.

Figure 3A:
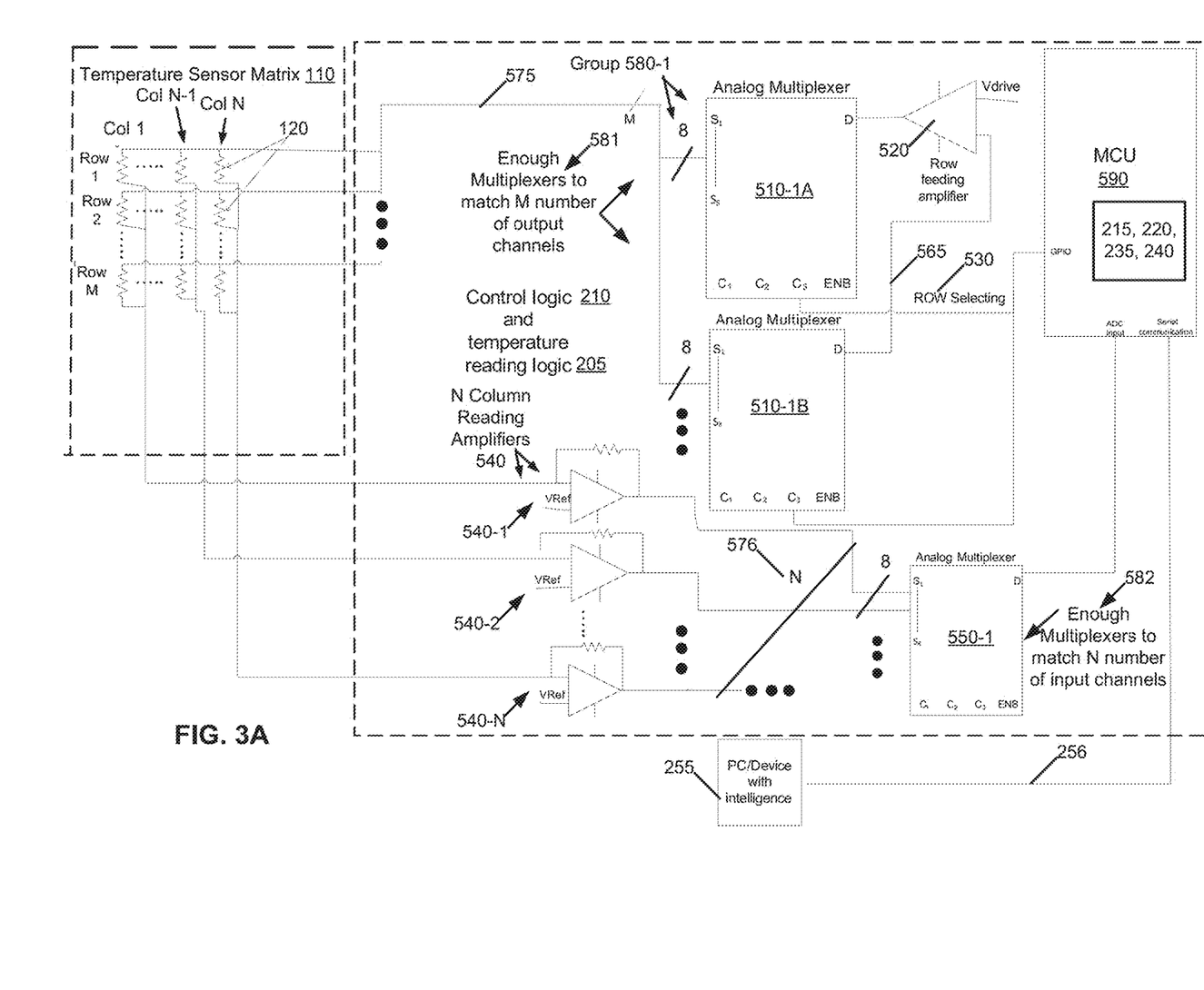
FIG. 3A is a circuit diagram in an exemplary embodiment for circuitry on a PWB that enables determining and transferring data for the temperature sensor matrix built into a layer of the PWB.

Referring to FIG. 3A, this figure is a circuit diagram in an exemplary embodiment for circuitry on a PWB that enables determining and transferring data for the temperature sensor matrix built into a layer of the PWB. FIG. 3A shows a temperature sensor matrix 110, which may be implemented as a single PWB layer 130, as previously described. The temperature sensor matrix 110 may be formed as an N×M set of temperature sensors 120, with N columns (Col) and M rows of such sensors. As an example, there could be a matrix 110 of 512×512, which yields 262,144 sensors 120. Many other options are possible, including options where N≠M, and having many more or fewer sensors 120.

The temperature sensor matrix 110 interfaces with a circuitry that comprises control circuitry 210 and temperature reading circuitry 205. The control circuitry 210 comprises an MCU 590, which comprises the one or more processors 215, the one or more memories 220, the A/D converters 235 and possibly the communication circuitry 240. Note that the MCU 590 may be considered to be a "processor" and as such the one or more processors 215 would be the circuitry on the MCU 590 that provides functions of a processor. The control circuitry 210 may also comprise the multiplexers 510 and the row feeding amplifier 520. The temperature reading circuitry 205 may comprise the N column reading amplifiers 540-1 through 540-M and the multiplexers 550. This separation into what comprises the control circuitry 210 and temperature reading circuitry 205 is somewhat arbitrary. For instance, the multiplexers 510 and the row feeding amplifier 520 could be considered to be part of the temperature reading circuitry 205.

With regard to operation, the MCU 590 produces row selecting signals 530 (via the GPIO port in this example) that is used to select one of the M rows for a single measurement via $C_1$, $C_2$, and $C_3$ inputs on a corresponding multiplexer 510. There are enough multiplexors 510 to match M rows of output channels. In this case, each of the multiplexors 510-1A and 510-1B has eight outputs $S_1$ to $S_8$ and three inputs $C_1$ to $C_3$, and enable connection (ENB), and a D connection. As indicated by reference 581, there should be enough multiplexers 510 and/or groups 580 thereof to match M number of output channels, as illustrated by reference 575. More specifically, for each set of eight outputs (in this example) that are generated, a group 580 of multiplexers 510-1A and 510-1B is used to drive current through one of the eight rows: group 580-1 includes two multiplexers 510-1A and 510-1B; and there would be M/8 groups 580. For 256 rows, for instance, there would be 256/8=32 groups 580 of multiplexers, where each group 580 has two multiplexers 510 and each group 580 also has a corresponding row feeding amplifier 520. Although it may not be necessary to use groups 580 of multiplexers 510, the reasoning behind using such groups 580 and the feedback path 565 is described in reference to FIG. 3B. After selection of the appropriate row and passing a known current through each sensor 120 in the row, the resistance change in sensors 120 creates change in output voltage at the column reading amplifiers 540, which typically comprise an OP-AMP circuit for each of the N columns.

For the column reading amplifiers 540, there are N column reading amplifiers 1-N. For instance, if there is a 512×512 sensor matrix 110 then there would be 512 OP-AMPS. There should be enough multiplexers 550 to match N number of input channels, see reference 582. See also reference 576, indicating there are N input channels. Note that for smaller matrices, such as 16×16, the multiplexers 550 might not be needed (e.g., if the MCU 590 has 16 A/D converters 235). Temperature as an analog voltage is sent to A/D converters 235 (via the ADC input of the MCU 590), which convert analog voltage to digital voltage information. The digital voltage information would then be changed by MCU to temperature information.

In this example, the MCU 590 may communicate with the PC/device with intelligence 255 via a serial communication port and via link 256. The PC 255 would then display the thermal image 160, as previously described.

Figure 3B:
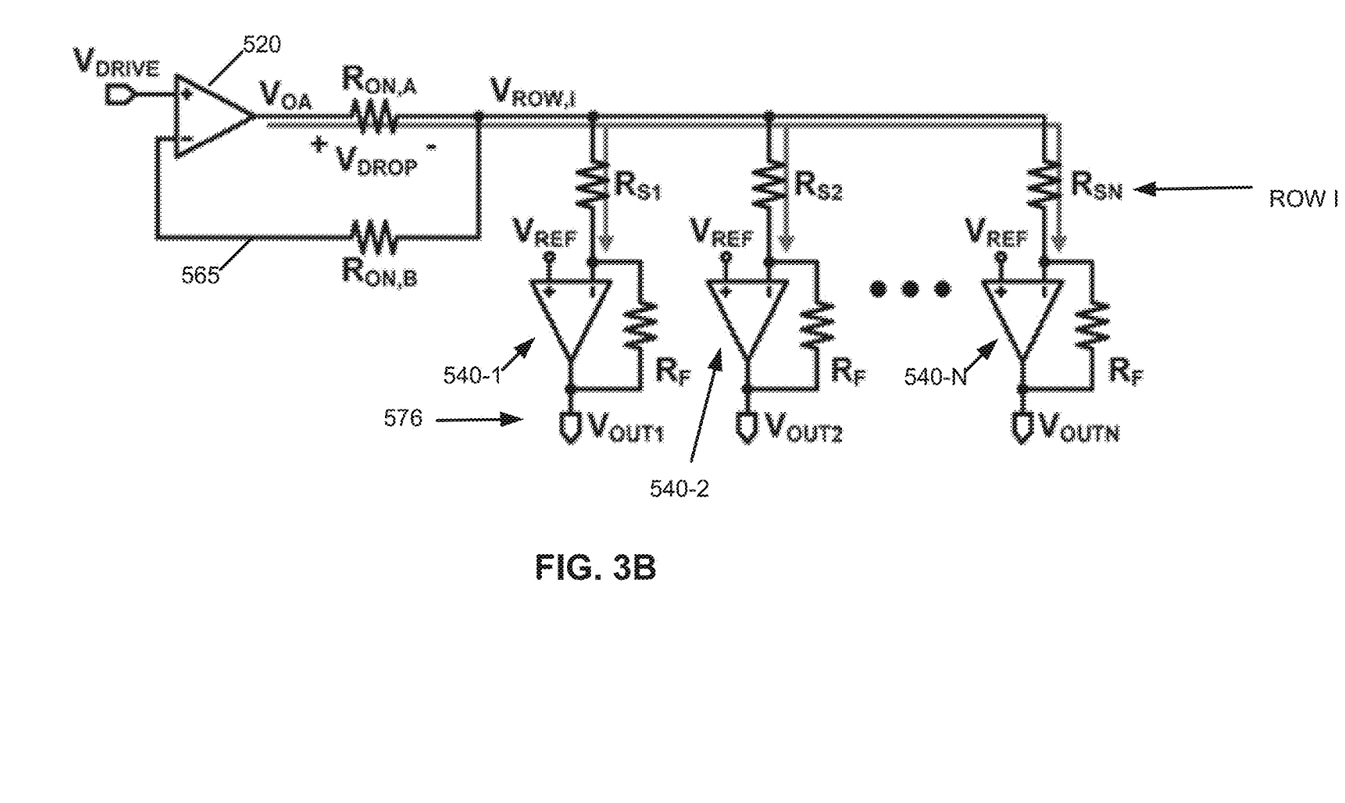
FIG. 3B is a figure illustrating why a group of multiplexers may be used in the exemplary embodiment of FIG. 3A.

In the example of FIG. 3A, for the group 580-1, there are two multiplexers 510-1A and 510-1B. All analog multiplexers, including multiplexers 510, have some sort of "ON" resistance. Because of this resistance, feedback of the operational amplifier is performed after the multiplexers to balance the feedback. This is illustrated by FIG. 3B. Feedback is performed via multiplexers 510. The row feeding amplifier 520 is shown driving (via $V_{Row,I}$) a single row (row I, where "I" is the letter "I") of temperature sensors 120, illustrated as resistors $R_{S1}$, $R_{S2}$, ..., $R_{sN}$. The ON resistance of the analog multiplexer 510-1A is illustrated as $R_{ON,A}$, and the ON resistance of the analog multiplexer 510-1B is illustrated as $R_{ON,B}$. The outputs 576 of the N column reading amplifiers 540 are illustrated as $V_{OUT1}$, $V_{OUT2}$, ..., $V_{OUTN}$. Each of the N column reading amplifiers 540 has a reference resistor, $R_F$, associated with it. The row feeding amplifier 520 outputs a voltage $V_{OA}$, which is reduced by the ON resistance of the analog multiplexer 510-1 (as illustrated as $R_{ON,A}$) to the voltage $V_{Row,I}$. The feedback path 565, which includes the ON resistance ($R_{ON,B}$) of the multiplexer 510-1B, causes the row feeding amplifier to compensate for the ON resistance ($R_{ON,A}$) of the multiplexer 510-1A.

Figure 4A:
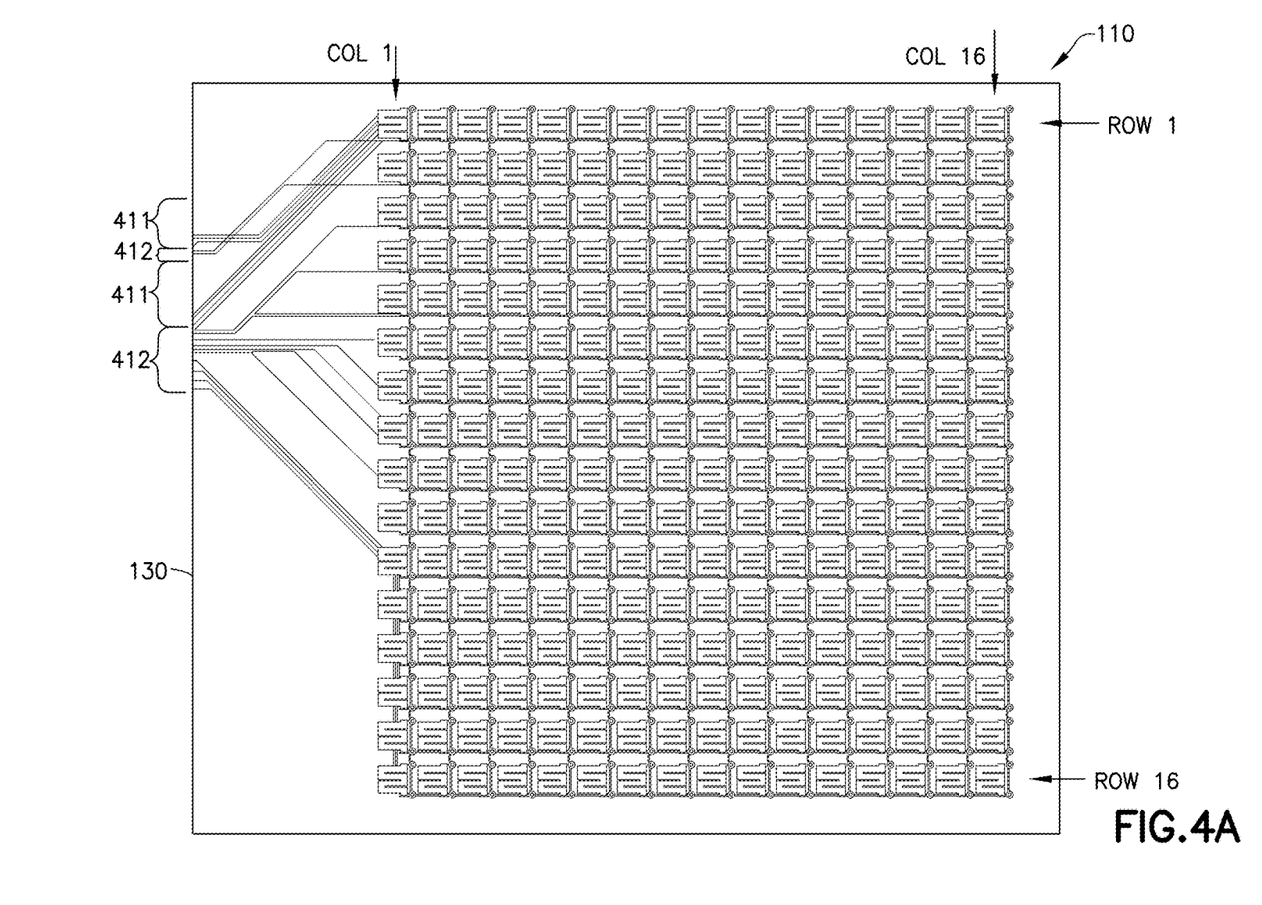
FIG. 4A illustrates a temperature sensor layout for a matrix of 16×16 (256 sensors) built into a layer of a PWB.

Referring to FIG. 4A, this figure illustrates an example of a temperature sensor layout for a matrix of 16×16 (256 sensors) that may be built into one of the layers 130 of the PWB 100. The temperature sensor matrix 110 comprises 256 sensors 120 in a 16×16 array (16 columns and 16 rows). The traces 411 are, in this example, routed to another layer 130, and the traces 412 are routed to a different layer 130.

Figure 4B:
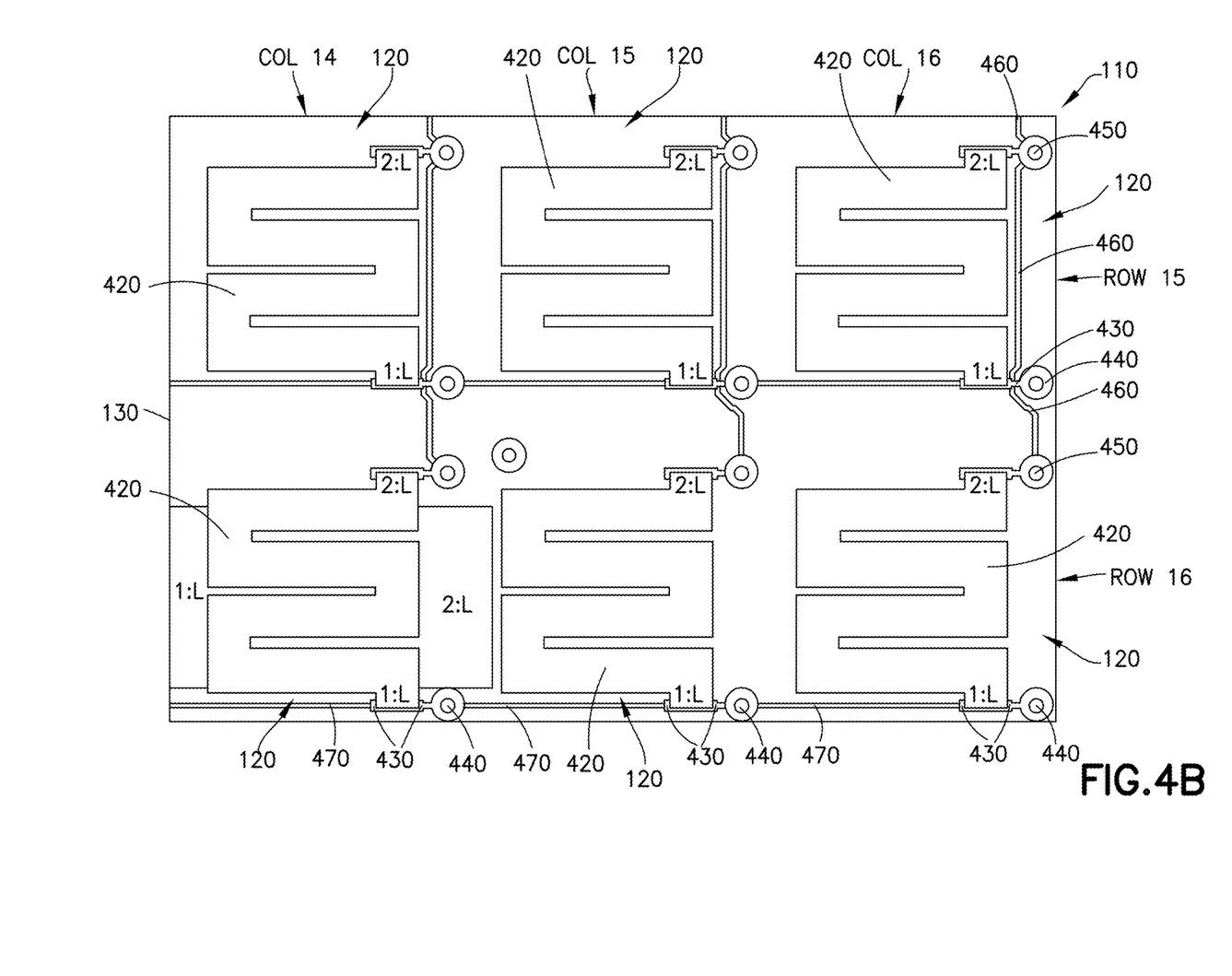
FIG. 4B illustrates a set of six sensors from the layout in FIG. 4A.

FIG. 4B illustrates an example of a set of six sensors from the layout in FIG. 4A. In particular, the sensors 120 are from rows 15 and 16 and columns 14, 15, and 16. Each sensor 120 comprises an individual sensor element 420. The sensor elements 420 maybe any material that has temperature/resistance dependency, such as the 126-03 adhesive from the company Creative Materials. The sensor element 420 may have a serpentine shape, but any other shapes such as rectangles, squares, or other resistive circuit designs, and the like are possible. Each sensor 120 is connected to two vias 440 and 450, which connect the printed layer to a normal PWB layer. Reference 430 indicates copper traces in the printed layer. The copper traces 430 are pads that connect a corresponding via 440 or 450 to the sensor element 420. References 460 and 470 indicate normal PWB traces. In this example, the rows are interconnected through the PWB traces 470 and the columns are connected through the PWB traces 460. Also, the vias 440 are the inputs to the sensors and vias 450 are the outputs from the sensors. This is merely exemplary, however.

In the description above, the multiplexers 510 are used to provide current to a selected single one of the M rows (and therefore to all columns in that selected row), and may select each row in the temperature sensor matrix 110 at different times. The N column reading amplifiers 540 and, if used, the multiplexers 550 are used in conjunction with the A/D converters to read voltages from the temperature sensors 120 in the N columns (and from the selected row) and to create digital representations of these. It is noted that the rows and columns could be "swapped', such that the multiplexers 510 are used to provide current to a selected single one of the N columns (and therefore to all rows in that selected column), and may select each column in the temperature sensor matrix 110 at different times. The M column reading amplifiers 540 and, if used, the multiplexers 550 are used in conjunction with the A/D converters to read voltages from the temperature sensors 120 in the M rows (and from the selected columns) and to create digital representations of these.

Without in any way limiting the scope, interpretation, or application of the claims appearing below, a technical effect of one or more of the example embodiments disclosed herein is determination of thermal information for a printed wiring board. Another technical effect of one or more of the example embodiments disclosed herein is the possibility to produce a thermal image of a layer of a printed wiring board. Another technical effect of one or more of the example embodiments disclosed herein is a possibility of having thousands of sensors in a single printed wiring board, thereby having a very detailed thermal imaging ability.

The following are additional examples.

EXAMPLE 1

An apparatus, comprising:
a printed wiring board comprising multiple layers including inner and outer layers, wherein at least one of the inner layers comprises an integral temperature sensor matrix, the temperature sensor matrix comprising multiple temperature sensors arrayed over at least part of area occupied by the at least one of the layers.

EXAMPLE 2

The apparatus of example 1, wherein the temperature sensor matrix is formed within the at least one of the inner layers.

EXAMPLE 3

The apparatus of any of examples 1 or 2, wherein each of one or more of the multiple temperature sensors comprises a sensor element having a resistive circuit shape.

EXAMPLE 4

The apparatus of example 3, wherein the resistive circuit shape is one of serpentine, rectangles, and squares.

EXAMPLE 5

The apparatus of any of examples 1 to 4, further comprising temperature reading circuitry configured to read information corresponding to temperatures from the multiple temperature sensors and control circuitry configured to control the temperature reading circuitry to read information corresponding to the temperatures from the multiple temperature sensors.

EXAMPLE 6

The apparatus of example 5, wherein:
the temperature reading circuitry comprises:
a first set of multiplexers coupled to inputs of the temperature sensors in the at least one of the temperature sensor matrices and able to select each one of a plurality of sets of the temperature sensors in the at least one of the temperature sensor matrices to apply current through each temperature sensor in the selected set; and
a set of reading amplifiers coupled to outputs of the temperature sensors and able to read outputs from the selected set of temperature sensors; and
the control circuitry is configured to cause the first set of multiplexers to apply current to each one of the plurality of sets of the temperature sensors in the at least one of the temperature sensor matrices and is configured to cause the set of reading amplifiers to read the information corresponding to the temperatures from individual ones of the plurality of sets of the temperature sensors.

EXAMPLE 7

The apparatus of example 6, wherein the temperature sensors in the temperature sensor matrix are formed into N columns and M rows, wherein the sets of the temperature sensors in the temperature sensor matrix and selected by the first set of multiplexers are individual ones of the M rows, and wherein the set of reading amplifiers are coupled to outputs of each of the N columns and read information from each of the N columns.

EXAMPLE 8

The apparatus of example 6, wherein the temperature sensors in the temperature sensor matrix are formed into N columns and M rows, wherein the sets of the temperature sensors in the temperature sensor matrix and selected by the first set of multiplexers are individual ones of the N columns, and wherein the set of reading amplifiers are coupled to outputs of each of the M rows and read information from each of the M rows.

EXAMPLE 9

The apparatus of any of examples 6 to 8, wherein the first set of multiplexers coupled to inputs of the temperature sensors comprises a plurality of groups of multiplexers, each group of multiplexers comprising first and second multiplexers and having a corresponding amplifier to provide current through the first multiplexer, wherein a second of the two multiplexers for each group is configured to feed back output of the first multiplexer to the amplifier for comparison by the amplifier with a drive voltage.

EXAMPLE 10

The apparatus of any of examples 6 to 9, further comprising a plurality of analog to digital converters coupled to outputs of the reading amplifiers, the plurality of analog to digital converters configured to convert analog voltages from the outputs of the reading amplifiers to digital values of the analog voltages.

EXAMPLE 11

The apparatus of example 10, wherein:
the temperature reading circuitry further comprises a second set of multiplexers, the second set of multiplexers coupled to the outputs of the reading amplifiers and each of the second set of multiplexers able to select one of a plurality of sets of the outputs of the reading amplifiers and to forward the selected set of the outputs of the reading amplifiers to the plurality of analog to digital converters; and
the control circuitry is configured to control the second set of multiplexers to select one or more of the multiplexers in the second set of multiplexers to cause the selected multiplexers in the second set to have their outputs routed to the plurality of analog to digital converters.

EXAMPLE 12

The apparatus of any of examples 10 or 11, wherein the control circuitry is further configured to convert the digital values of the analog voltages into corresponding temperature values.

EXAMPLE 13

The apparatus of any of examples 6 to 12, wherein the control circuitry comprises one or more memories having computer readable code, and one or more processors, wherein the one or more memories and the computer program code are configured, with the one or more processors, to cause the temperature reading circuitry to read information corresponding to the temperatures from the multiple temperature sensors, and to output the information to another computer for display as a thermal image of the printed wiring board.

EXAMPLE 14

The apparatus of example 13, wherein the one or more memories and the computer program code are configured, with the one or more processors, to cause the information to be converted from digital voltage values into corresponding temperature values prior to outputting the information to the other computer.

EXAMPLE 15

The apparatus of any of examples 1 to 14, further comprising a computer system configured to display temperature data from the multiple temperature sensors of the temperature sensor matrix on a display as a thermal image of the printed wiring board.

EXAMPLE 16

An apparatus, comprising:
a printed wiring board comprising multiple layers including inner and outer layers, wherein a selected one or more of the inner layers comprises an integral temperature sensor matrix, the temperature sensor matrix comprising means for measuring temperature, the means for measuring temperature arrayed over at least part of an area occupied by the selected layer.
Another example is the apparatus of example 16, further comprising means for performing any of the methods of examples 17 to 31.

EXAMPLE 17

A method, comprising:
measuring information corresponding to temperatures in a temperature sensor matrix, the temperature sensor matrix formed in selected one or more of inner layers of a printed wiring board comprising multiple layers including inner and outer layers, the temperature sensor matrix comprising multiple temperature sensors arrayed over at least part of an area occupied by the selected layer; and
outputting indications of the information.

EXAMPLE 18

The method of example 17, wherein the temperature sensor matrix is formed within the at least one of the inner layers.

EXAMPLE 19

The method of any of examples 17 or 18, wherein each of one or more of the multiple temperature sensors comprises a sensor element having a resistive circuit shape.

EXAMPLE 20

The method of example 19, wherein the resistive circuit shape is one of serpentine, rectangles, and squares.

EXAMPLE 21

The method of any of examples 17 to 20, further comprising reading the information corresponding to temperatures from the multiple temperature sensors.

EXAMPLE 22

The method of example 21, wherein reading the information corresponding to temperatures from the multiple temperature sensors further comprises:

selecting each one of a plurality of sets of the temperature sensors in the at least one of the temperature sensor matrices to apply current through each temperature sensor in the selected set;

applying current to each one of the plurality of sets of the temperature sensors in the at least one of the temperature sensor matrices;

amplifying and reading outputs from the selected set of temperature sensors.

EXAMPLE 23

The method of example 22, wherein the temperature sensors in the temperature sensor matrix are formed into N columns and M rows, wherein the sets of the temperature sensors in the temperature sensor matrix that are selected are individual ones of the M rows, and wherein reading comprises reading information from each of the N columns

EXAMPLE 24

The method of example 22, wherein the temperature sensors in the temperature sensor matrix are formed into N columns and M rows, wherein the sets of the temperature sensors in the temperature sensor matrix that are selected are individual ones of the N columns, and wherein reading further comprises reading information from each of the M rows.

EXAMPLE 25

The method of any of examples 22 to 24, wherein the selecting and applying are performed by a plurality of groups of multiplexers, each group of multiplexers comprising first and second multiplexers and having a corresponding amplifier to provide current through the first multiplexer, and wherein the method further comprises configuring a second of the two multiplexers for each group to feed back output of the first multiplexer to the amplifier for comparison by the amplifier with a drive voltage.

EXAMPLE 26

The method of any of examples 22 to 25, further comprising converting analog voltages from the outputs of the reading amplifiers to digital values of the analog voltages.

EXAMPLE 27

The method of example 26, wherein the amplifying and reading is performed by a plurality of reading amplifiers, the converting is performed by a plurality of analog to digital converters, and wherein reading the information corresponding to temperatures from the multiple temperature sensors further comprises selecting one of a plurality of sets of outputs of the reading amplifiers in order to forward the selected set of the outputs of the reading amplifiers to the plurality of analog to digital converters.

EXAMPLE 28

The method of any of examples 26 or 27, further comprising converting the digital values of the analog voltages into corresponding temperature values.

EXAMPLE 29

The method of any of examples 22 to 28, further comprising outputting the information to another computer for display as a thermal image of the printed wiring board.

EXAMPLE 30

The method of example 29, further comprising causing the information to be converted from digital voltage values into corresponding temperature values prior to outputting the information to the other computer.

EXAMPLE 31

The method of any of examples 17 to 30, further comprising displaying temperature data from the multiple temperature sensors of the temperature sensor matrix on a display as a thermal image of the printed wiring board.

EXAMPLE 32

An apparatus, comprising:

means for measuring information corresponding to temperatures in a temperature sensor matrix, the temperature sensor matrix formed in selected one or more of inner layers of a printed wiring board comprising multiple layers including inner and outer layers, the temperature sensor matrix comprising means for measuring temperature, the means for measuring temperature arrayed over at least part of an area occupied by the selected layer; and means for outputting indications of the information.

EXAMPLE 33

The apparatus of example 32, further comprising means for performing any of the methods of examples 18 to 31.

Embodiments herein maybe implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIGS. 2A or 2B. A computer-readable medium may comprise a computer-readable storage medium (e.g., memories 220, 275 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

A/D analog to digital
ADC analog to digital converter
eNB (or eNodeB) evolved Node B (e.g., an LTE base station)
GUI graphical user interface
I/F interface
LTE long term evolution
MCU microcontroller unit
MME mobility management entity
NCE network control element
N/W network
OP-AMP operational amplifier
PC personal computer
PCB printed circuit board
PWB printed wiring board
R&D research and development
RRH remote radio head
Rx receiver
SGW serving gateway
T temperature
Tx transmitter
UE user equipment (e.g., a wireless, typically mobile device)
V voltage

What is claimed is:

1. An apparatus, comprising:
a printed wiring board comprising multiple layers including inner and outer layers, wherein at least one of the inner layers comprises an integral temperature sensor matrix, the temperature sensor matrix comprising multiple temperature sensors arrayed over at least part of an area occupied by the at least one of the inner layers.

2. The apparatus of claim 1, wherein the temperature sensor matrix is formed within the at least one of the inner layers.

3. The apparatus of claim 1, further comprising a computer system configured to display temperature data from the multiple temperature sensors of the temperature sensor matrix on a display as a thermal image of the printed wiring board.

4. The apparatus of claim 1, wherein each of one or more of the multiple temperature sensors comprises a sensor element having a resistive circuit shape.

5. The apparatus of claim 4, wherein the resistive circuit shape is one of serpentine, rectangles, and squares.

6. The apparatus of claim 1, further comprising temperature reading circuitry configured to read information corresponding to temperatures from the multiple temperature sensors, and further comprising control circuitry configured to control the temperature reading circuitry to read information corresponding to the temperatures from the multiple temperature sensors.

7. The apparatus of claim 6, wherein:
the temperature reading circuitry comprises:
a first set of multiplexers coupled to inputs of the temperature sensors in the temperature sensor matrix and able to select each one of a plurality of sets of the temperature sensors in the temperature sensor matrix to apply current through each temperature sensor in the selected set; and
a set of reading amplifiers coupled to outputs of the temperature sensors and able to read outputs from the selected set of temperature sensors; and
the control circuitry is configured to cause the first set of multiplexers to apply current to each one of the plurality of sets of the temperature sensors in the temperature sensor matrix and is configured to cause the set of reading amplifiers to read the information corresponding to the temperatures from individual ones of the plurality of sets of the temperature sensors.

8. The apparatus of claim 7, wherein the temperature sensors in the temperature sensor matrix are formed into N columns and M rows, wherein the sets of the temperature sensors in the temperature sensor matrix and selected by the first set of multiplexers are individual ones of the M rows, and wherein the set of reading amplifiers are coupled to outputs of each of the N columns and read information from each of the N columns.

9. The apparatus of claim 7, wherein the temperature sensors in the temperature sensor matrix are formed into N columns and M rows, wherein the sets of the temperature sensors in the temperature sensor matrix and selected by the first set of multiplexers are individual ones of the N columns, and wherein the set of reading amplifiers are coupled to outputs of each of the M rows and read information from each of the M rows.

10. The apparatus of claim 7, wherein the first set of multiplexers coupled to inputs of the temperature sensors comprises a plurality of groups of multiplexers, each group of multiplexers comprising first and second multiplexers and having a corresponding amplifier to provide current through the first multiplexer, wherein a second of the two multiplexers for each group is configured to feed back output of the first multiplexer to the amplifier for comparison by the amplifier with a drive voltage.

11. The apparatus of claim 7, wherein the control circuitry comprises one or more memories having computer readable code, and one or more processors, wherein the one or more memories and the computer program code are configured, with the one or more processors, to cause the temperature reading circuitry to read information corresponding to the temperatures from the multiple temperature sensors, and to output the information to another computer for display as a thermal image of the printed wiring board.

12. The apparatus of claim 11, wherein the one or more memories and the computer program code are configured, with the one or more processors, to cause the information to be converted from digital voltage values into corresponding temperature values prior to outputting the information to the other computer.

13. The apparatus of claim 7, further comprising a plurality of analog to digital converters coupled to outputs of the reading amplifiers, the plurality of analog to digital converters configured to convert analog voltages from the outputs of the reading amplifiers to digital values of the analog voltages.

14. The apparatus of claim 13, wherein:
the temperature reading circuitry further comprises a second set of multiplexers, the second set of multiplexers coupled to the outputs of the reading amplifiers and each of the second set of multiplexers able to select one of a plurality of sets of the outputs of the reading amplifiers and to forward the selected set of the outputs of the reading amplifiers to the plurality of analog to digital converters; and the control circuitry is configured to control the second set of multiplexers to select one or more of the multiplexers in the second set of multiplexers to cause the selected multiplexers in the second set to have their outputs routed to the plurality of analog to digital converters.

15. The apparatus of claim 13, wherein the control circuitry is further configured to convert the digital values of the analog voltages into corresponding temperature values.

16. An apparatus, comprising:

a printed wiring board comprising multiple layers including inner and outer layers, wherein a selected one or more of the inner layers comprises an integral temperature sensor matrix, the temperature sensor matrix comprising means for measuring temperature, the means for measuring temperature arrayed over at least part of an area occupied by the selected one or more of the inner layers.

17. A method, comprising:

measuring information corresponding to temperatures in a temperature sensor matrix, the temperature sensor matrix formed in a selected one or more of inner layers of a printed wiring board comprising multiple layers including inner and outer layers, the temperature sensor matrix comprising multiple temperature sensors arrayed over at least part of an area occupied by the selected one or more of the inner layers; and outputting indications of the information.

18. The method of claim 17, further comprising reading the information corresponding to temperatures from the multiple temperature sensors and wherein the reading further comprises:

selecting each one of a plurality of sets of the temperature sensors in the at least one of the temperature sensor matrices to apply current through each temperature sensor in the selected set;

applying current to each one of the plurality of sets of the temperature sensors in the at least one of the temperature sensor matrices;

amplifying and reading outputs from the selected set of temperature sensors.

19. The method of claim 18, further comprising outputting the information to a computer for displaying as a thermal image of the printed wiring board.

20. The method of claim 19, further comprising displaying temperature data from the multiple temperature sensors of the temperature sensor matrix on a display as the thermal image of the printed wiring board.

* * * * *